United States Patent
Pang et al.

(10) Patent No.: US 11,256,447 B1
(45) Date of Patent: Feb. 22, 2022

(54) MULTI-BCRC RAID PROTECTION FOR CKD

(71) Applicant: EMC IP HOLDING COMPANY LLC, Hopkinton, MA (US)

(72) Inventors: Lixin Pang, Needham, MA (US); Jiahui Wang, Framingham, MA (US); Peng Wu, Westborough, MA (US); Rong Yu, West Roxbury, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/065,558

(22) Filed: Oct. 8, 2020

(51) Int. Cl.
*G06F 11/10* (2006.01)
*G06F 11/20* (2006.01)
*G06F 3/06* (2006.01)
*H04L 67/1097* (2022.01)

(52) U.S. Cl.
CPC ............ *G06F 3/067* (2013.01); *G06F 3/0644* (2013.01); *G06F 3/0659* (2013.01); *G06F 3/0664* (2013.01); *H04L 67/1097* (2013.01)

(58) Field of Classification Search
CPC ... G06F 2009/45562; G06F 2009/4557; G06F 2009/45579; G06F 9/4401; G06F 9/4411; G06F 9/45558; G06F 9/54
See application file for complete search history.

(56) References Cited

U.S. PATENT DOCUMENTS 8,898,444 B1 * 11/2014 LeCrone ............. G06F 9/45558 713/1
11,144,396 B1 * 10/2021 Hua ..................... G06F 11/1092

* cited by examiner

*Primary Examiner* — Yong J Choe
(74) *Attorney, Agent, or Firm* — Anderson Gorecki LLP

(57) ABSTRACT

A storage array that presents a logical storage device to hosts that is accessed using front-end tracks and access tangible managed drive using back-end tracks locates multiple front-end tracks in individual back-end tracks. Error-correcting codes are used to identify different front-end tracks in a back-end track when the back-end track is copied from the managed drives into storage array memory. CKD front-end tracks can be split into multiple partial CKD front-end tracks that are located at contiguous address space in different back-end tracks. The front-end tracks that are located in a particular back-end track may be selected to reduce or minimize unused space. The front-end tracks in a back-end track may be logically stored on different production volumes.

20 Claims, 8 Drawing Sheets

MULTI-BCRC RAID PROTECTION FOR CKD

TECHNICAL FIELD

The subject matter of this disclosure is generally related to electronic data storage systems and more particularly to management of metadata and efficient use of storage capacity in such systems.

BACKGROUND

High capacity data storage systems such as storage area networks (SANs) and network-attached storage (NAS) are used to maintain large data sets and contemporaneously support multiple users. A SAN includes a network of interconnected compute nodes that manage access to data stored on arrays of drives. The compute nodes respond to input-output (IO) commands from host applications that typically run on servers known as "hosts." Examples of host applications may include, but are not limited to, software for email, accounting, manufacturing, inventory control, and a wide variety of other business processes. A NAS system includes a compute node that manages access to drives but unlike a SAN the compute node maintains a filesystem that describes high level host application data structures such as files. In contrast, SANs are based on a block architecture that presents logical drives with contiguous logical block addresses (LBAs) to the hosts. The SAN compute nodes lack knowledge of high-level data structures of the host application data. Consequently, a host would use a filename to read a file from a NAS system but would use LBAs to read a file from a SAN. The SAN maintains metadata that maps between LBAs and address space on the managed drives.

In order for the SAN metadata to be efficiently manageable a single fixed size "allocation unit" of storage capacity is used by the compute nodes for accessing the managed drives. For example, and without limitation, the compute nodes may only read and write from and to the managed drives using fixed size back-end tracks (BE TRKs). BE TRKs should not be confused with the "tracks" that are related to hard disk drive (HDD) architecture. A "sector" is the smallest unit of storage that an HDD can process. An HDD track corresponds to a concentric band on a disk and a sector is a portion of one of those concentric bands, e.g. 1 track may have 32 sectors. BE TRKs can be significantly larger in size than HDD tracks and are not limited by the physical architecture of a spinning disk. The BE TRK size for a SAN is selected as a design choice and is generally proportional to the manageability of the metadata, but inversely proportional to resource utilization efficiency. Using larger capacity BE TRKs can reduce the resource burden on memory and processing resources for metadata management but decreases the efficiency of managed drive utilization by creating more unused space in BE TRKs. However, as the total storage capacity of drives and SANs increases due to technological advances there is a greater need to increase the BE TRK size to mitigate the metadata management burden on memory and processing resources.

SUMMARY

All examples, aspects and features mentioned in this document can be combined in any technically possible way.

In accordance with some implementations an apparatus comprises: a data storage system comprising: a plurality of non-volatile drives; and a plurality of interconnected compute nodes that present at least one logical production volume to hosts and manage access to the drives, wherein the hosts access the production volume using front-end tracks as allocation units and the compute nodes access the drives using back-end tracks as allocation units and the compute nodes locate multiple front-end tracks in a single back-end track; whereby storage capacity of the drives is more efficiently utilized in comparison with locating only one front-end track in each back-end track.

In accordance with some implementations a method comprises: in a data storage system comprising a plurality of non-volatile drives and a plurality of interconnected compute nodes: the compute nodes presenting at least one logical production volume to hosts and managing access to the drives, wherein the hosts access the production volume using front-end tracks as allocation units and the compute nodes access the drives using back-end tracks as allocation units; and the compute nodes locating multiple front-end tracks in a single back-end track; whereby storage capacity of the drives is more efficiently utilized in comparison with locating only one front-end track in each back-end track.

In accordance with some implementations a computer-readable storage medium stores instructions that when executed by a computer cause the computer to perform a method for using a computer system to store data, the method comprising: compute nodes presenting at least one logical production volume to hosts, wherein the hosts access the production volume using front-end tracks as allocation units and the compute nodes access the drives using back-end tracks as allocation units; and the compute nodes locating multiple front-end tracks in a single back-end track; whereby storage capacity of the drives is more efficiently utilized in comparison with locating only one front-end track in each back-end track.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile electronic storage media. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic," if used herein, refers to special purpose physical circuit elements, firmware, software, computer instructions that are stored on a non-transitory computer-readable medium and implemented by multi-purpose tangible processors, alone or in any combination. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
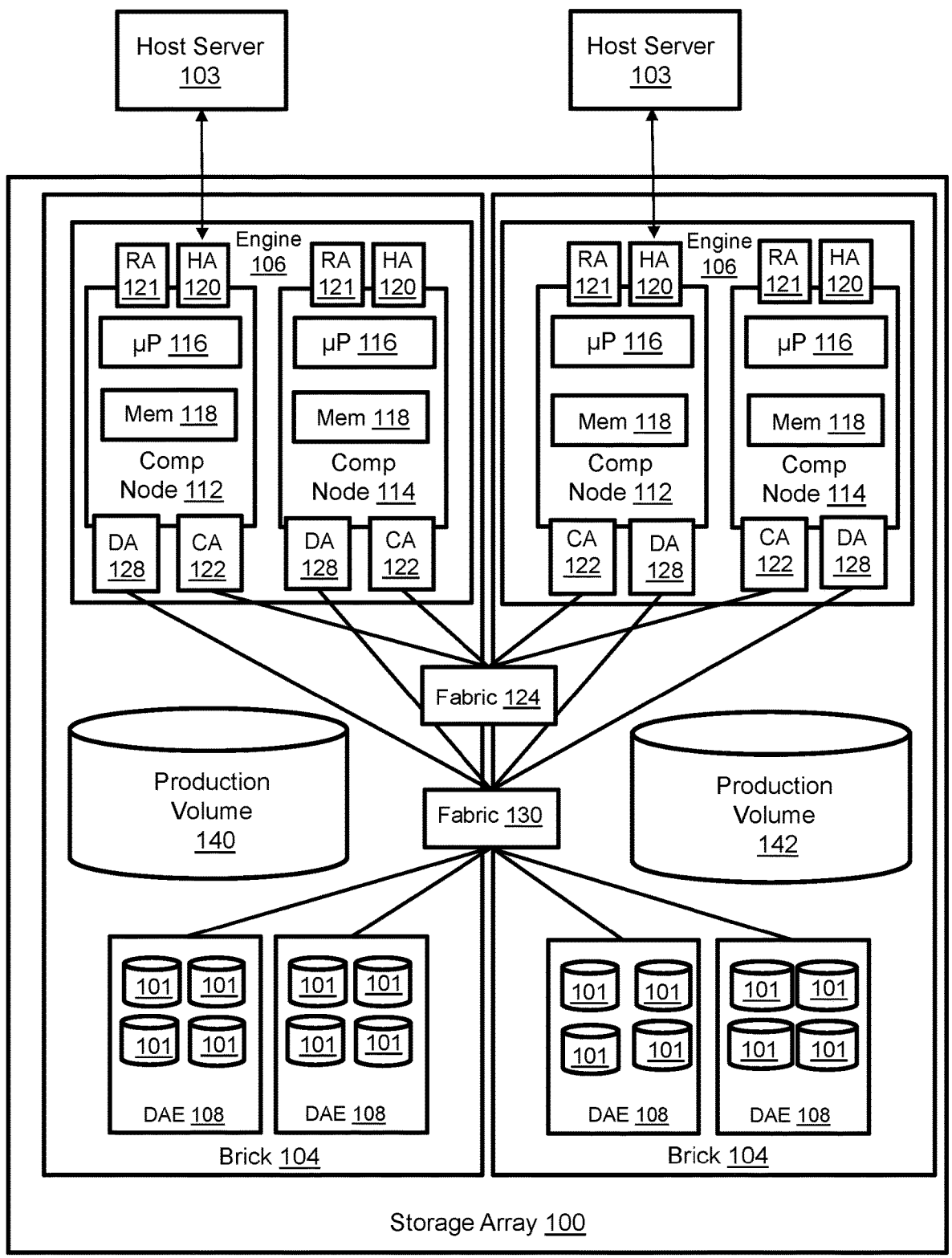
FIG. 1 illustrates a storage array in which multiple front-end tracks, possibly from FBA and CKD production volumes, reside in the same back-end track.

FIG. 1 illustrates a storage array 100 in which multiple front-end tracks, possibly from Count Key Data (CKD) and Fixed Block Architecture (FBA) production volumes 140, 142, can be located in the same back-end track on a managed drive 101. Typical prior art designs have a 1-to-1 relationship between front-end tracks and back-end tracks and CKD tracks are not located in the same storage pool with FBA tracks. The storage array 100 is one example of a storage area network (SAN). The storage array 100 is depicted in a simplified data center environment supporting two host servers 103 that run host applications. The host servers 103 may be implemented as individual physical computing devices, virtual machines running on the same hardware platform under control of a hypervisor, or in containers on the same hardware platform. The storage array 100 includes one or more bricks 104. Each brick includes an engine 106 and one or more drive array enclosures (DAEs) 108. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g. on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103. Each host adapter has resources for servicing input-output commands (IOs) from the host servers. The HA resources may include processors, volatile memory, and ports via which the host servers may access the storage array. Each compute node also includes a remote adapter (RA) 121 for communicating with other storage systems. Each compute node also includes one or more drive adapters (DAs) 128 for communicating with managed drives 101 in the DAEs 108. Each DA has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 are non-volatile electronic data storage media such as, without limitation, solid-state drives (SSDs) based on electrically erasable programmable read-only memory (EEPROM) technology such as NAND and NOR flash memory and hard disk drives (HDDs) with spinning disk magnetic storage media. Drive controllers may be associated with the managed drives as is known in the art. An interconnecting fabric 130 enables implementation of an N-way active-active back end. A back-end connection group includes all drive adapters that can access the same drive or drives. In some implementations every DA 128 in the storage array can reach every DAE via the fabric 130. Further, in some implementations every DA in the storage array can access every managed drive 101.

Data associated with instances of a host application running on the hosts 103 is maintained on the managed drives 101. The managed drives 101 are not discoverable by the hosts but the storage array creates logical storage devices referred to herein as production volumes 140, 142 that can be discovered and accessed by the hosts. Without limitation, a production volume may be referred to as a storage object, source device, production device, or production LUN, where the logical unit number (LUN) is a number used to identify logical storage volumes in accordance with the small computer system interface (SCSI) protocol. From the perspective of the hosts 103, the production volume 140 is a single drive having a set of contiguous fixed-size logical block addresses (LBAs) on which data used by the instances of the host application resides. However, the host application data is stored at non-contiguous addresses on various managed drives 101, e.g. at ranges of addresses distributed on multiple drives or multiple ranges of addresses on one drive. The compute nodes maintain metadata that maps between the production volumes 140, 142 and the managed drives 101 in order to process 10 commands from the hosts.

Figure 2:
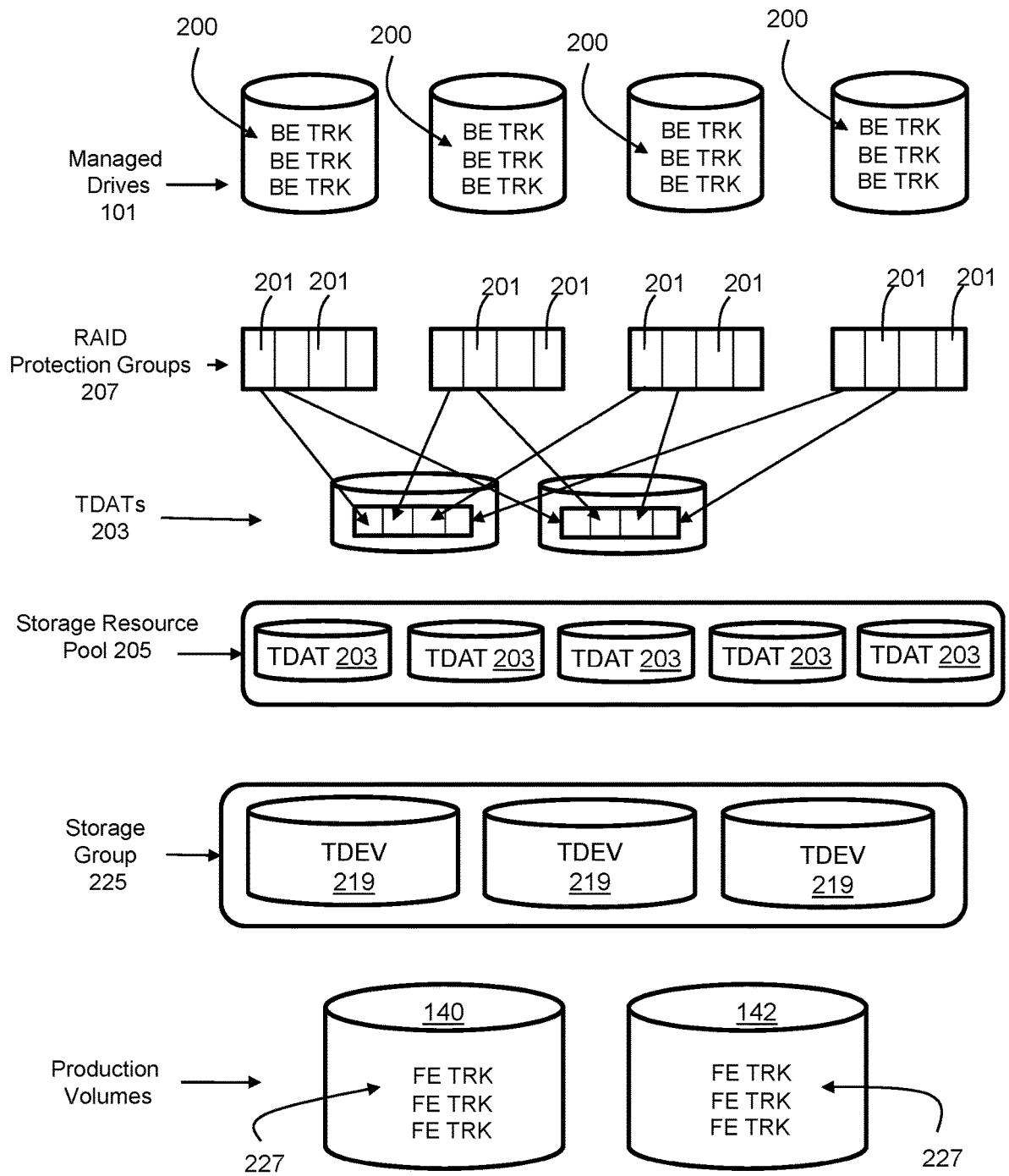
FIG. 2 illustrates layers of abstraction between the managed drives and the production volumes of the storage array of FIG. 1.

FIG. 2 illustrates layers of abstraction between the managed drives 101 and the production volumes 140, 142. The basic allocation unit of storage capacity that is used by the compute nodes to access the managed drives 101 is a back-end track (BE TRK) 200. In other words, the compute nodes do not access the managed drives using allocation units other than BE TRKs. BE TRKs all have the same fixed size which may be an integer multiple of the managed drive sector size. The managed drives 101 are each organized into partitions or splits 201 of equal storage capacity, i.e. every split has the same fixed size. Each split 201 may include multiple BE TRKs. Selection of split storage capacity is a design implementation and, for context and without limitation, may be some fraction or percentage of the capacity of a managed drive equal to an integer multiple of the sector size. Each split may include a contiguous range of logical addresses. Groups of splits that include splits from different managed drives are used to create RAID protection groups 207. The RAID protection groups are distributed on data devices (TDATs) 203. A storage resource pool 205, also known as a "data pool" or "thin pool," is a collection of TDATs 203 of the same emulation and RAID protection group type, e.g. RAID-5. In some implementations all TDATs in a drive group are of a single RAID protection group type and all have the same size (storage capacity). Logical thin devices (TDEVs) 219 are created using TDATs. The TDATs and TDEVs are accessed using BE TRKs as the allocation unit. Multiple TDEVs 219 are organized into a storage group 225. The production volumes 140, 142 are created from one or more storage groups. Host application data is stored in front-end tracks (FE TRKs) 227, that may be referred to as blocks, on the production volumes 140, 142. The FE TRKs 227 on the production volumes 140, 142 are mapped to BE TRKs 200 of the managed drives 101 by metadata.

The FE TRKs do not necessarily have a single fixed size. On a production volume with a fixed-block architecture (FBA) all the FBA FE TRKs have the same size. On a production volume with a variable-block architecture the FE TRKs exist in a variety of sizes. For example, a count key data (CKD) track includes data blocks that can vary in length, up to a limit. Variable size FE TRKs tend to create wasted space when one BE TRK is used to store one smaller FE TRK, which has been the norm. In the present disclosure FBA FE TRKs have a fixed size of 56 KB or 128 KB, CKD FE TRKs are treated as having a 56 KB fixed size, and BE TRKs have a 128 KB fixed size. However, these values should not be viewed as limiting the scope of the invention.

Figure 3:
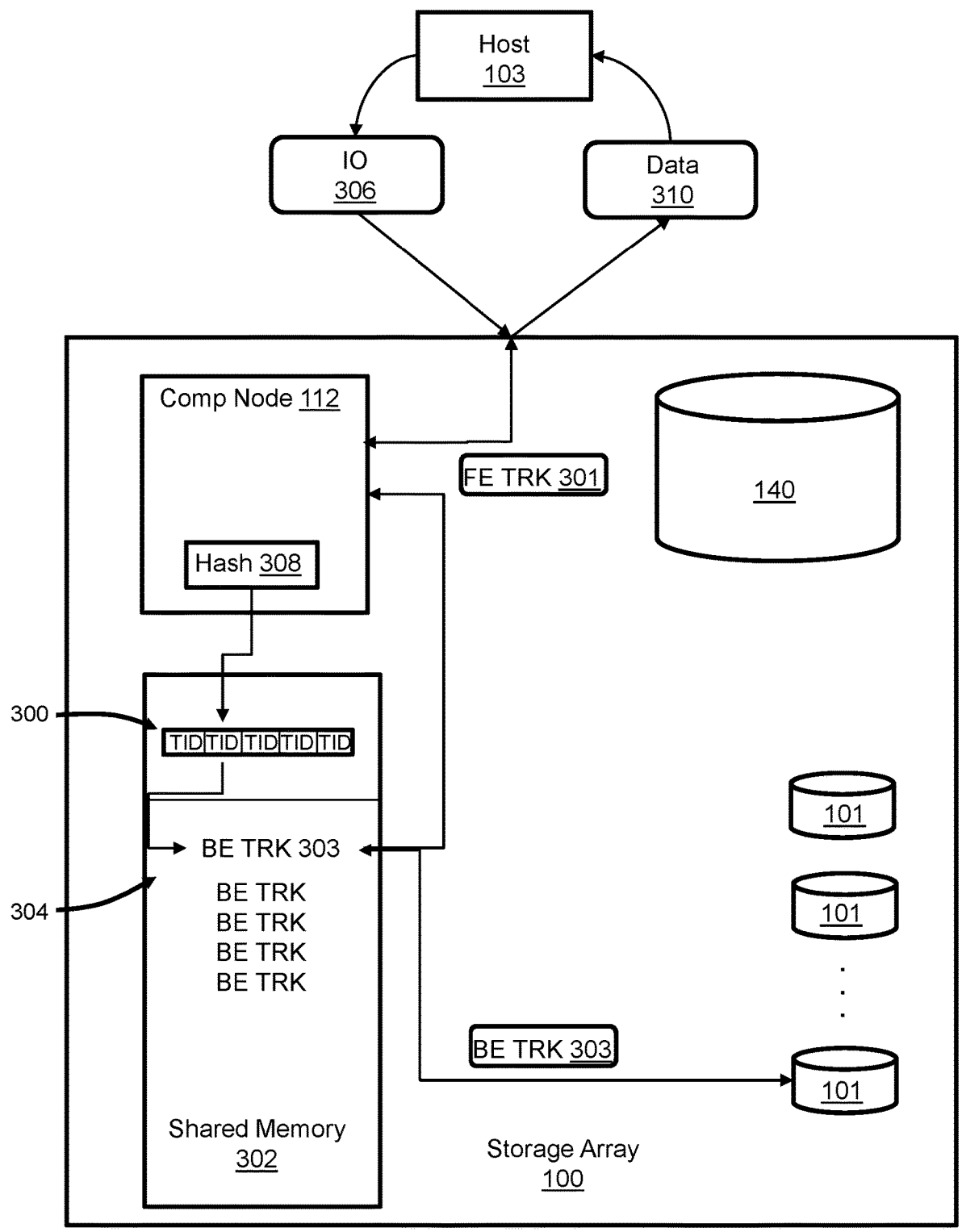
FIG. 3 illustrates how front-end tracks, back-end tracks, and metadata are used for data access in a SAN.

FIG. 3 illustrates how a FE TRK 301, BE TRK 303, and metadata 300 are used by the storage array 100 when servicing an IO command 306. A compute node 112 receives the IO command 306 from a host 103. In the illustrated example the IO command is a Read or Write to a FE TRK 301 of production volume 140. Metadata 300 is maintained in TIDs (track ID tables) that are located in an allocated portion of the shared memory 302. The TIDs include pointers to BE TRKs that contain host application data. The BE TRKs are located in another portion of the shared memory 302 and/or the managed drives 101. The compute node 112 identifies a TID corresponding to the IO command 306 and FE TRK 301 by inputting information such as the device number, cylinder number, head (track) and size obtained from the IO into a hash table 308. The hash table 308 indicates the location of the TID in the shared memory 302. The TID is used by the compute node 112 to find the corresponding host application data in the BE TRK 303. Specifically, the BE TRK 303 is accessed in the shared memory 302 if it is present in the shared memory. If the corresponding BE TRK 303 is not present in the shared memory 302, then the compute node 112 uses the TID to locate and copy the BE TRK 303 from the managed drives 101 into the shared memory 302 to service the IO. In the case of a Read IO the FE TRK data specified by the IO 306 is obtained from the BE TRK 303 in the shared memory and a copy of the data is sent to the host 103. In the case of a Write IO the FE TRK data is copied into the BE TRK in the shared memory and eventually destaged to the managed drives 101, e.g. overwriting the stale copy on the managed drives.

Figure 4:
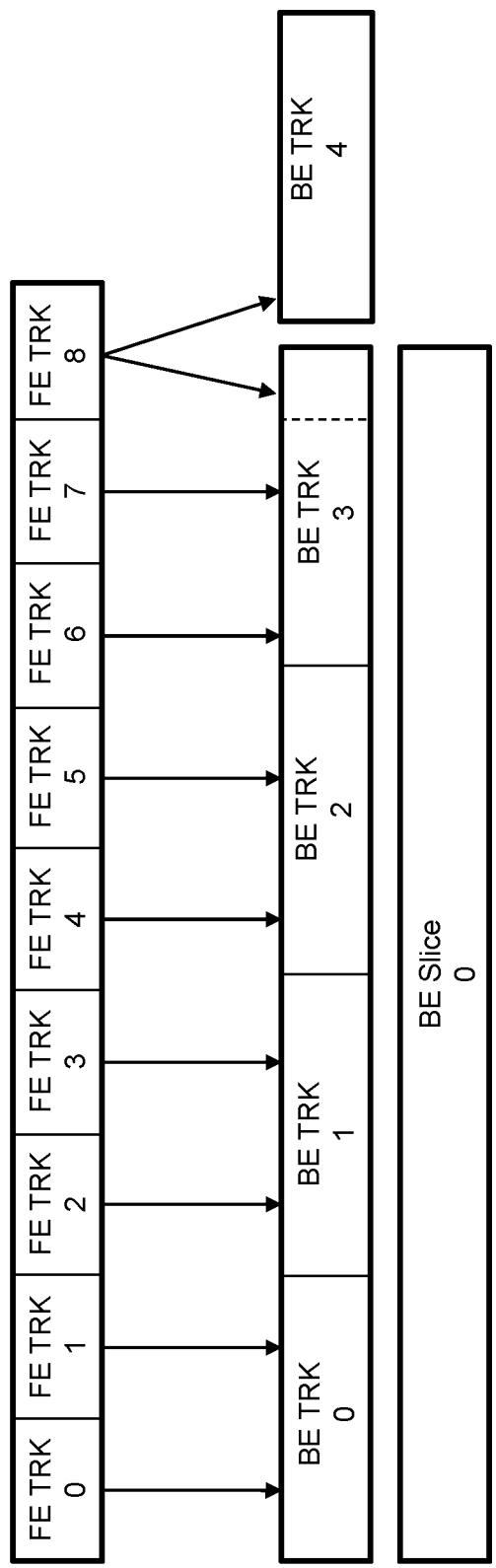
FIG. 4 illustrates storage of multiple front-end tracks in individual back-end tracks of a back-end slice.

FIG. 4 illustrates storage of multiple 56 KB FE TRKs in individual 128 KB BE TRKs of a back-end slice. FE TRKs 0 through 8 are logically stored on one or more production volumes. The metadata in the TIDs maps the FE TRKs to the BE TRKs but there may be only one TID per BE TRK in some implementations. Each FE TRK maintains its own BCRC/CRC that can be used to help distinguish between FE TRKs within a BE TRK. Each 128 KB BE TRK can be mapped to up to three full or partial 56 KB FE tracks. For example, 56 KB FE TRK 8 is split into two partial 28 KB FE TRKs, one of which is stored in BE TRK 3 while the other partial FE TRK from FE TRK 8 is stored in the next sequential BE TRK which in the illustrated example is BE TRK 4 that would be part of BE slice 1. More specifically, the partial FE TRKs are stored at contiguous address space of the trailing and leading blocks of adjacent BE TRKs are used. The partial FE TRKs are not necessarily equal in size.

Figure 5:
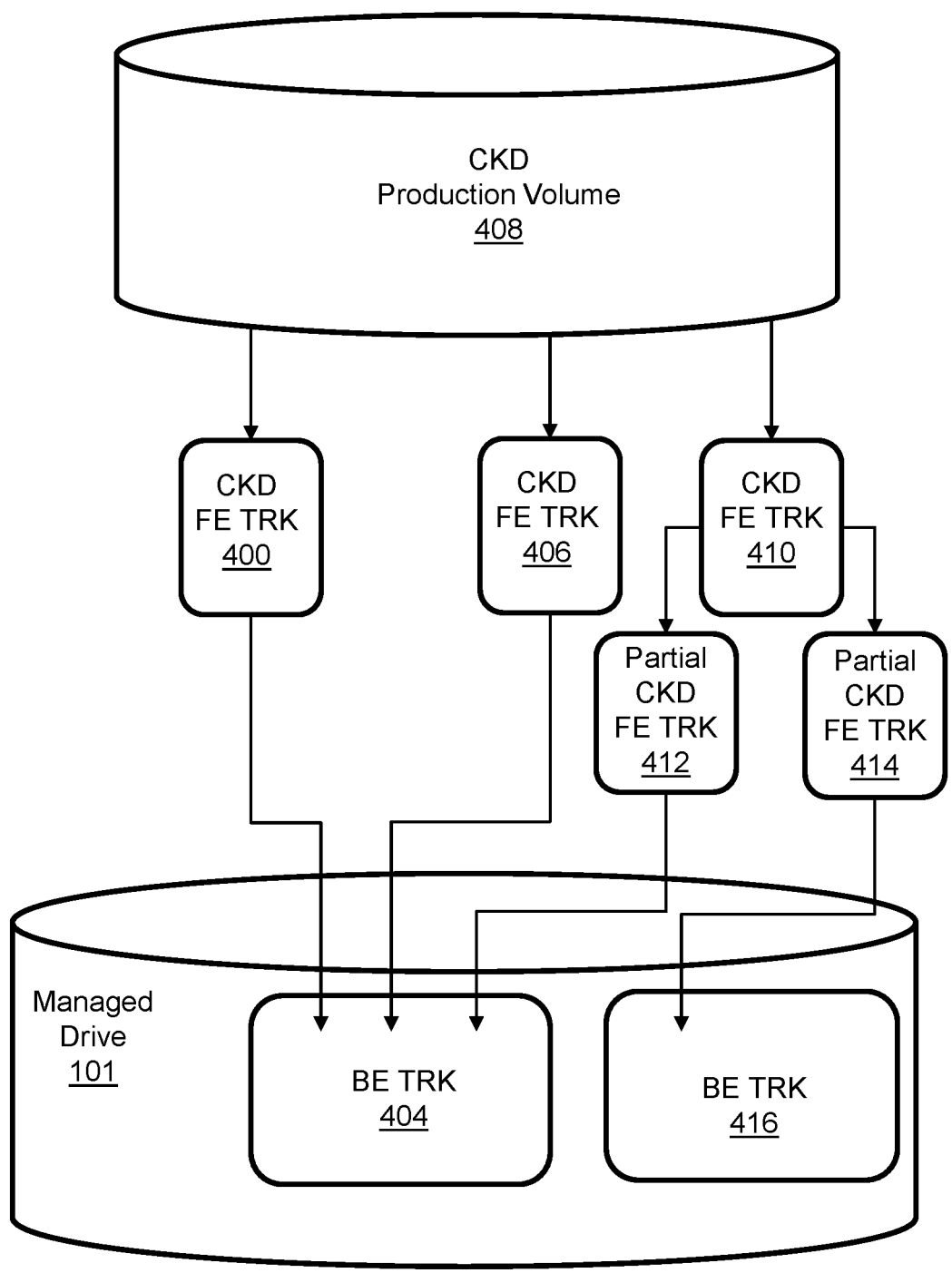
FIG. 5 illustrates storage of multiple full and partial CKD front-end tracks in a back-end track.

FIG. 5 illustrates storage of 56 KB CKD FE TRKs in a 128 KB BE TRK. A CKD FE TRK 400 and a CKD FE TRK 406 from CKD production volume 408 are stored in BE TRK 404. Optionally, another CKD FE TRK 410 is split into partial CKD FE TRK 412 and partial CKD FE TRK 414 and partial CKD FE TRK 412 is stored in BE TRK 404 while partial CKD FE TRK 414 is stored in BE TRK 416. The sizes of the partial FE TRKs resulting from the split and placement of partial FE TRKs in BE TRKs may be determined based on remaining space in BE TRKs. However, partial FE TRKs from the same FE TRK are located at contiguous space so pairs of adjacent BE TRKs are used. The metadata in the TIDs maps the FE TRKs to the BE TRKs. For example, the location of CKD FE TRK 406 within BE TRK 404 may be indicated with an offset or pointer. A compute node accesses CKD FE TRK 406 by copying BE TRK 404 into shared memory and using the metadata to locate CKD FE TRK 406. The BCRC of CKD FE TRK 406 is used to confirm the identity of the CKD FE TRK and validate the integrity of the data. A compute node accesses CKD FE TRK 410 by copying both BE TRK 404 and BE TRK 416 into shared memory and using the metadata to locate CKD FE TRK 406. The BCRC of CKD FE TRK 406 is used to confirm the identity of the CKD FE TRK and validate the integrity of the data.

Figure 6:
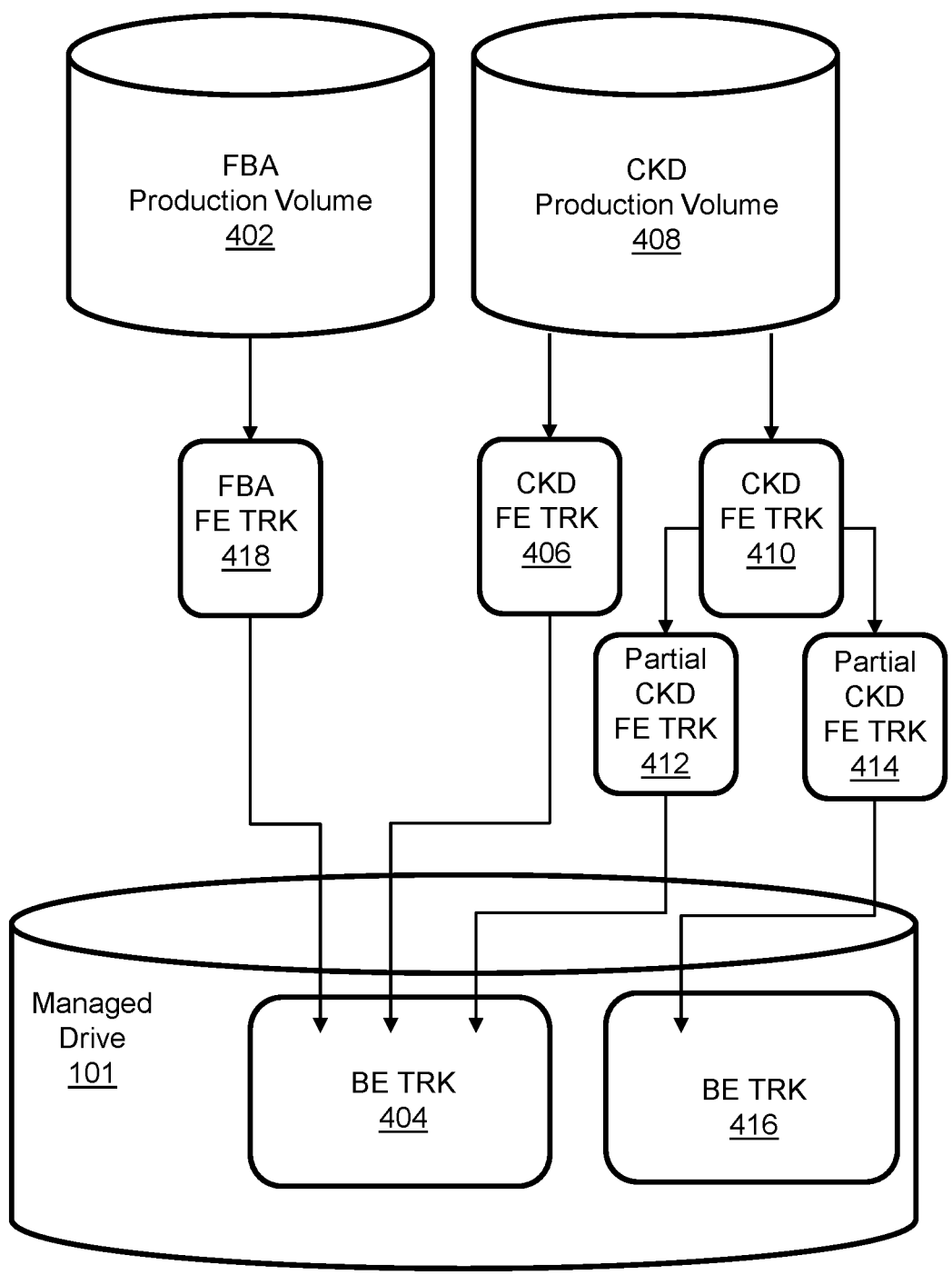
FIG. 6 illustrates storage of FBA and CKD front-end tracks in a back-end track.

FIG. 6 illustrates storage of FBA and CKD front-end tracks in a back-end track. In the illustrated example a 56 KB FBA FE TRK 418 from FBA production volume 402 is stored in 128 KB BE TRK 404 with CKD FE TRK 406 and, optionally, partial CKD FE TRK 412. The inclusion of FBE and CKD FE TRKs in the same BE TRK is enabled in part by the FBA FE TRK having a smaller size than the BE TRK. There would be insufficient space in a 128 KB BE TRK to accommodate a 128 KB FBA FE TRK and CKD FE TRKs.

Figure 7:
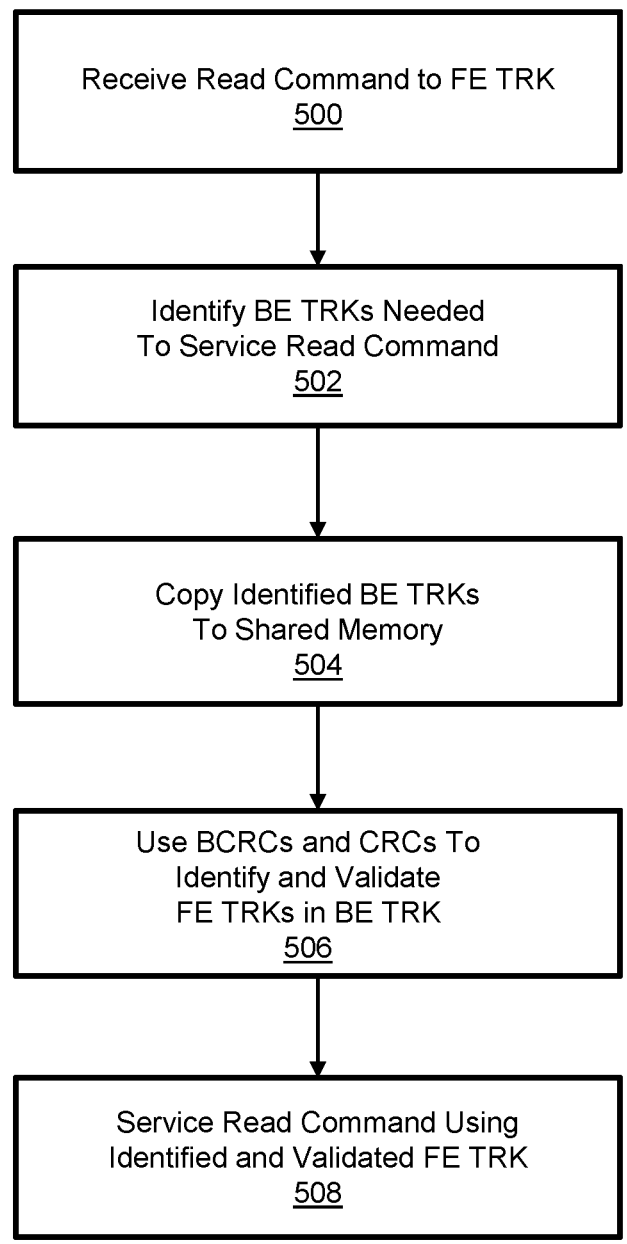
FIG. 7 illustrates steps associated with a Read operation.

FIG. 7 illustrates steps associated with a Read operation when multiple FE TRKs are located in a BE TRK. The process begins when a compute node receives a Read command associated with a FE TRK as indicated in step 500. The FE TRK could logically reside on a fixed track length production volume or a variable track length production volume. Step 502 is identifying the BE TRK or BE TRKs that are required to service the Read command. The compute node uses the information contained in the IO to identify TIDs in the metadata maintained in the shared memory. The TIDs indicate the location of the BE TRK or BE TRKs in the shared memory and/or managed drives. Step 504 is copying the identified BE TRK or BE TRKs into the shared memory from the managed drives. Step 504 is not performed if the identified BE TRK or BE TRKs are already present in the shared memory. Step 506 is using error-detecting codes to identify and validate the FE TRK accessed by the IO from the BE TRK or BE TRKs. Examples of error-correcting codes include cyclic redundancy check (CRC) and block CRC (BCRC). The storage array may implement a type of data integrity field (DIF) which is a standard for identifying and correcting errors in communications between a compute node and managed drive or storage controller. DIF would normally use only one CRC or BCRC per BE TRK but in the illustrated example at least some of the BE TRKs include multiple BCRCs and/or CRCs because each FE TRK has an error-correcting code. The BCRCs are used to identify and validate the corresponding variable length FE TRKs in the BE TRKs copied from the managed drives to the shared memory. The CRCs are used to identify and validate the corresponding fixed length FE TRKs in the BE TRKs copied from the managed drives to the shared memory. The BCRCs and CRCs of a BE TRK are different so they can be used to identify individual FE TRKs although the metadata also indicates locations of FE TRKs within a BE TRK. Failure to validate the accessed FE TRK based on the BCRC/CRC may indicate that an error occurred while copying the BE TRK from the managed drives to the shared memory or that the associated data or metadata has been corrupted, in which case the BE TRK may be copied again from the managed drives and the error-correction code may be used to recover corrupted data and metadata.

Figure 8:
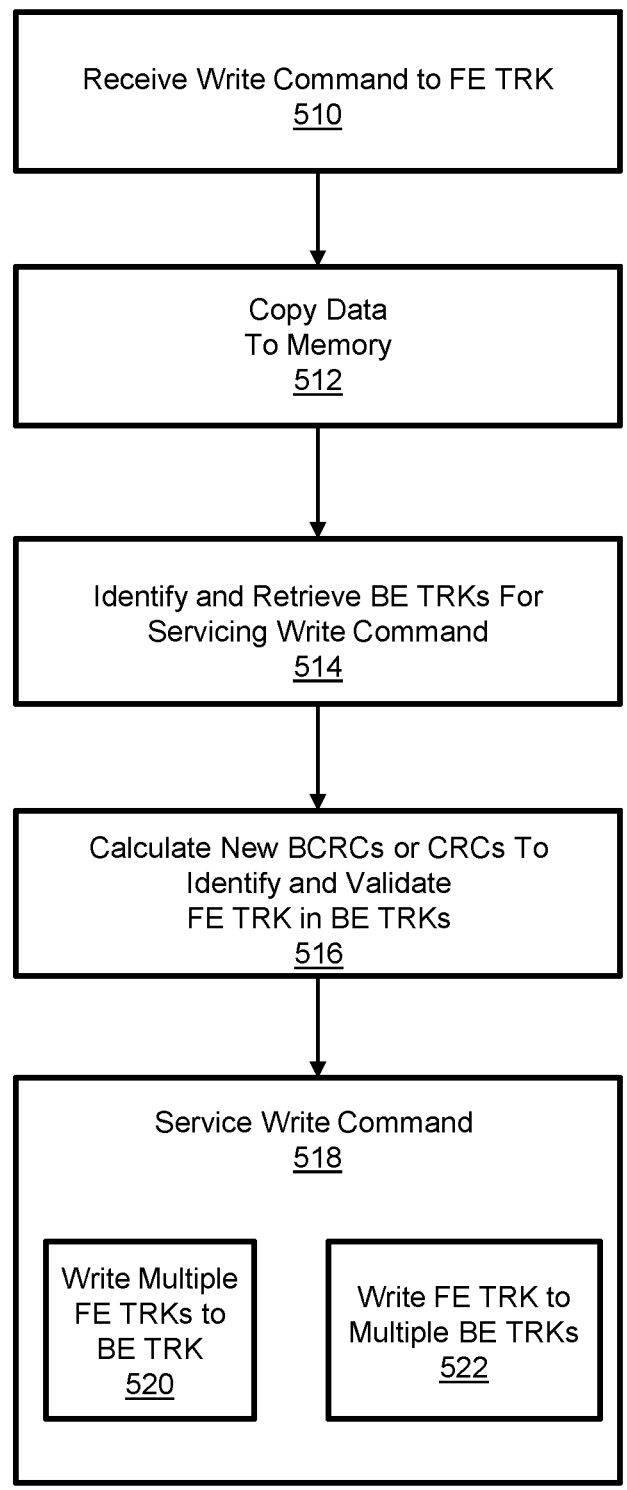
FIG. 8 illustrates steps associated with a Write operation.

FIG. 8 illustrates steps associated with a Write operation when multiple FE TRKs are located in a BE TRK. The process begins when a compute node receives a Write command associated with a FE TRK as indicated in step 510. The FE TRK could logically reside on a fixed track length production volume or a variable track length production volume. Step 512 is copying the FE TRK data that is being written into memory, e.g. local memory in a FA. Step 514 is identifying and retrieving the BE TRK or BE TRKs needed for servicing the Write command. For example, if the FE TRK is one of multiple FE TRKs in a single BE TRK then that BE TRK is copied into the shared memory from the managed drives. If the FE TRK is one of multiple FE TRKs in multiple BE TRKs then those BE TRKs are copied into the shared memory from the managed drives. If the BE TRK or BE TRKs are already present in the shared memory, then they can be located and accesses in the shared memory without accessing the managed drives. Step 516 is calculating a new BCRC or CRC based on the updated FE TRK in FA memory. The FE TRK in the FA memory typically differs from the corresponding FE TRK data on the managed drives and in the shared memory due to the Write operation. Consequently, the new BCRC or CRC will differ from the BCRC or CRC for the FE TRK on the managed drives and shared memory. Step 518 is servicing the Write command. The Write is acknowledged, and the stale FR TRK data and BCRC/CRC are overwritten in the shared memory by the updated FR TRK data and updated BCRC/CRC. Step 518 may include writing multiple FE TRKs to a BE TRK as indicated in step 520 and writing a FE TRK to multiple BE TRKs as indicated in step 522. Associations between FE TRKs and BE TRKs may be changed if necessary or for improved utilization of storage capacity. When the BE TRKs in the shared memory have been updated, including update of data and BCRC/CRC, those BE TRKs may be destaged, i.e. written to the managed drives, thereby overwriting the stale data and BCRCs/CRCs.

Locating multiple FBA and CKD FE TRKs in a single BE TRK advantageously decreases the average amount of unused storage space in BE TRKs and thus on the managed drives by more efficiently packing BE TRKs and avoiding the need for dedicated FBA and CKD storage pools. Efficiency can be further improved by splitting some FE TRKs into partial FE TRKs that are distributed on multiple BE TRKs and using BE TRKs to accommodate FE TRKs from multiple production volumes. Metadata is also reduced because TIDs are maintained for each BE TRK rather than every FE TRK. Using BCRCs/CRCs to identify and validate FE TRKs in a BE TRK or BE TRKs facilitates implementation of these features.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
a data storage system comprising:
a plurality of non-volatile drives; and
a plurality of interconnected compute nodes that present at least one logical production volume to hosts and manage access to the plurality of non-volatile drives, wherein the hosts access the production volume using front-end tracks as allocation units and the compute nodes access the plurality of non-volatile drives using back-end tracks as allocation units and the compute nodes locate multiple front-end tracks in a single back-end track;
whereby storage capacity of the plurality of non-volatile drives is more efficiently utilized in comparison with locating only one front-end track in each back-end track.

2. The apparatus of claim 1 wherein the front-end tracks are count key data (CKD) tracks.

3. The apparatus of claim 2 wherein the compute nodes split at least some of the CKD front-end track into multiple partial CKD front-end tracks that are located in separate back-end tracks.

4. The apparatus of claim 3 wherein the compute nodes locate one of the partial CKD front-end tracks and multiple CKD front-end tracks in one back-end track.

5. The apparatus of claim 3 wherein the compute nodes locate one of the partial CKD front-end tracks and multiple fixed-block architecture (FBA) front-end tracks in one back-end track.

6. The apparatus of claim 1 wherein the compute nodes locate front-end tracks from different production volumes in a back-end track.

7. The apparatus of claim 1 wherein the compute nodes use error-correcting codes to identify different front-end tracks in a back-end track.

8. A method comprising:
in a data storage system comprising a plurality of non-volatile drives and a plurality of interconnected compute nodes:
the compute nodes presenting at least one logical production volume to hosts and managing access to the plurality of non-volatile drives, wherein the hosts access the production volume using front-end tracks as allocation units and the compute nodes access the plurality of non-volatile drives using back-end tracks as allocation units; and
the compute nodes locating multiple front-end tracks in a single back-end track;
whereby storage capacity of the plurality of non-volatile drives is more efficiently utilized in comparison with locating only one front-end track in each back-end track.

9. The method of claim 8 comprising the compute nodes locating multiple count key data (CKD) front-end tracks in the single back-end track.

10. The method of claim 9 comprising the compute nodes splitting at least some of the CKD front-end track into multiple partial CKD front-end tracks and locating those partial CKD front-end tracks in separate back-end tracks.

11. The method of claim 10 comprising the compute nodes locating one of the partial CKD front-end tracks and multiple CKD front-end tracks in one back-end track.

12. The method of claim 10 comprising the compute nodes locating one of the partial CKD front-end tracks and multiple fixed-block architecture (FBA) front-end tracks in one back-end track.

13. The method of claim 8 comprising the compute nodes locating front-end tracks from different production volumes in a back-end track.

14. The method of claim 8 comprising the compute nodes using error-correcting codes to identify different front-end tracks in a back-end track.

15. A computer-readable storage medium storing instructions that when executed by a computer cause the computer to perform a method for using a computer system to store data, the method comprising:
 compute nodes presenting at least one logical production volume to hosts, wherein the hosts access the production volume using front-end tracks as allocation units and the compute nodes access non-volatile drives using back-end tracks as allocation units; and
 the compute nodes locating multiple front-end tracks in a single back-end track; whereby storage capacity of the non-volatile drives is more efficiently utilized in comparison with locating only one front-end track in each back-end track.

16. The computer-readable storage medium of claim 15 wherein the method further comprises the compute nodes using error-correcting codes to identify different front-end tracks in a back-end track.

17. The computer-readable storage medium of claim 15 wherein the method further comprises the compute nodes locating multiple count key data (CKD) front-end tracks in the single back-end track.

18. The computer-readable storage medium of claim 17 wherein the method further comprises the compute nodes splitting at least some of the CKD front-end track into multiple partial CKD front-end tracks and locating those partial CKD front-end tracks in separate back-end tracks.

19. The computer-readable storage medium of claim 18 wherein the method further comprises the compute nodes locating one of the partial CKD front-end tracks and multiple CKD front-end tracks in one back-end track.

20. The computer-readable storage medium of claim 18 wherein the method further comprises the compute nodes locating one of the partial CKD front-end tracks and multiple fixed-block architecture (FBA) front-end tracks in one back-end track.

\* \* \* \* \*